United States Patent
Oroskar et al.

(10) Patent No.: US 9,337,983 B1
(45) Date of Patent: May 10, 2016

(54) USE OF DISCRETE PORTIONS OF FREQUENCY BANDWIDTH TO DISTINGUISH BETWEEN ACK AND NACK TRANSMISSIONS

(71) Applicant: Sprint Spectrum L.P., Overland Park, KS (US)

(72) Inventors: Siddharth S. Oroskar, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 155 days.

(21) Appl. No.: 14/209,067

(22) Filed: Mar. 13, 2014

(51) Int. Cl.
*H04W 72/04* (2009.01)
*H04L 5/00* (2006.01)

(52) U.S. Cl.
CPC ............ *H04L 5/0055* (2013.01); *H04L 5/0007* (2013.01)

(58) Field of Classification Search
CPC ..................................................... H04L 5/0055
USPC ......... 370/329, 335, 216, 229, 336, 337, 390, 370/312
See application file for complete search history.

(56) References Cited

U.S. PATENT DOCUMENTS

| | | | | |
|---|---|---|---|---|
| 7,206,280 | B1 * | 4/2007 | Khan | H04L 1/1835 370/216 |
| 8,125,921 | B2 | 2/2012 | Frenger et al. | |
| 2004/0109433 | A1 * | 6/2004 | Khan | H04L 1/1614 370/345 |
| 2004/0179474 | A1 | 9/2004 | Usuda et al. | |
| 2006/0153216 | A1 | 7/2006 | Hosein et al. | |
| 2006/0176881 | A1 | 8/2006 | Ma et al. | |
| 2007/0263570 | A1 * | 11/2007 | Alapuranen | H04B 7/2656 370/337 |
| 2008/0081655 | A1 | 4/2008 | Shin et al. | |
| 2008/0212582 | A1 * | 9/2008 | Zwart | H04L 1/1692 370/390 |
| 2009/0055703 | A1 | 2/2009 | Kim et al. | |
| 2009/0109906 | A1 | 4/2009 | Love et al. | |
| 2010/0002655 | A1 * | 1/2010 | Ofuji | H04J 13/0059 370/335 |
| 2010/0024645 | A1 | 9/2010 | Nangia et al. | |
| 2010/0246414 | A1 * | 9/2010 | Oksman | H04L 1/1854 370/248 |
| 2011/0085516 | A1 * | 4/2011 | Pajukoski | H04L 5/001 370/330 |
| 2011/0249656 | A1 | 10/2011 | Cai et al. | |
| 2011/0292915 | A1 * | 12/2011 | Prakash | H04L 5/0064 370/336 |
| 2012/0170479 | A1 * | 7/2012 | Ren | H04L 5/0055 370/252 |
| 2013/0176950 | A1 * | 7/2013 | Hakola | H04W 72/042 370/329 |
| 2013/0223352 | A1 | 8/2013 | Sartori et al. | |

(Continued)

OTHER PUBLICATIONS

U.S. Appl. No. 14/146,488, filed Jan. 2, 2014.

(Continued)

*Primary Examiner* — Parth Patel

(57) ABSTRACT

The air interface between a first node and a second node will span a frequency bandwidth defining two distinct portions, and acknowledgement message transmission such as Hybrid-ARQ message transmission will make use of those distinct portions to distinguish ACKs from NACKs. In particular, ACKs may be restricted to being transmitted within one portion of the frequency bandwidth, while NACKs may be restricted to being transmitted in different portion of the frequency bandwidth. Consequently, when the first node transmits data to the second node and receives an acknowledgement message sent in response from the second node, the first node may determine, based on which portion of the frequency bandwidth the first node received the acknowledgement message in, whether the acknowledgement message is an ACK or rather a NACK.

20 Claims, 5 Drawing Sheets

(56) References Cited

U.S. PATENT DOCUMENTS

| | | |
|---|---|---|
| 2013/0242889 A1 | 9/2013 | Khoryaev et al. |
| 2014/0029559 A1 | 1/2014 | Seo et al. |
| 2014/0036799 A1 | 2/2014 | Bharadwaj et al. |
| 2014/0164864 A1* | 6/2014 | Takeda ............... H04L 1/1854 714/749 |
| 2015/0030005 A1* | 1/2015 | Sambhwani ........ H04W 52/325 370/335 |
| 2015/0071183 A1 | 3/2015 | Bontu et al. |
| 2015/0245315 A1* | 8/2015 | Kawasaki ............... H04W 4/06 370/312 |
| 2015/0249974 A1 | 9/2015 | Lee et al. |

OTHER PUBLICATIONS

"cdma2000 High Rate Packet Data Air Interface Specification," 3GPP2 C.50024-A, Section 10.7 ("Enhanced Forward Traffic Channel MAC Protocol") Version 3.0 (Sep. 2006).

First Action Interview Pilot Program Pre-Interview Communication from U.S. Appl. No. 14/146,488, dated Sep. 29, 2015.

* cited by examiner

USE OF DISCRETE PORTIONS OF FREQUENCY BANDWIDTH TO DISTINGUISH BETWEEN ACK AND NACK TRANSMISSIONS

BACKGROUND

Unless otherwise indicated herein, the materials described in this section are not prior art to the claims and are not admitted to be prior art by inclusion in this section.

When two devices wirelessly communicate with each other over an air interface, the devices may apply an acknowledgement scheme that helps to ensure receipt of transmitted data. According to such a scheme, when one device (transmitting device) transmits a segment of data to another device or is expected to transmit a segment of data to the other device, the other device (receiving device) may determine whether it successfully receives the data and may then responsively send to the transmitting device an acknowledgement message indicating either that it successfully received the data or that it did not successfully receive the data, and if the acknowledgement message indicates lack of successful receipt, the transmitting device may responsively re-transmit the segment of data to the receiving device.

In practice, the acknowledgement message may be either an ACK (positive acknowledgement) to indicate successful receipt or a NACK (negative acknowledgment) to indicate lack of successful receipt, such as non-receipt or receipt with error. When the transmitting device receives such an acknowledgement message from the receiving device, the transmitting device may thus determine whether the acknowledgement message is an ACK or a NACK and may proceed accordingly. In particular, if the transmitting device determines that the acknowledgement message is a NACK, then the transmitting device may responsively re-transmit the segment of data to the receiving device (perhaps adding or substituting some error correction coding to help achieve successful receipt). Whereas, if the transmitting device determines that the acknowledgement message is an ACK, then the transmitting device may responsively not re-transmit the segment of data to the receiving device but may instead proceed to transmit a next segment of data to the receiving device.

Such an acknowledgement scheme can be applied in a cellular wireless communication system, where a base station serves a user equipment device (UE) such as a cell phone or other wirelessly-equipped communication device, and with the scheme applying for data communications in either direction between those entities. For instance, as a UE transmits segments of data over the air to its serving base station, the base station may responsively send acknowledgement messages to the UE to cause the UE to either re-transmit to the base station or to continue with transmission of next data to the base station. Further, as a base station transmits segments of data over the air to a served UE, the UE may responsively send acknowledgement messages to the base station to cause the base station to either re-transmit to the UE or to continue with transmission of next data to the UE.

OVERVIEW

In general, with such an acknowledgement scheme, it may be important to help ensure that the transmitting device can determine whether the acknowledgement message sent by the receiving device is an ACK or a NACK, so that the transmitting device can properly either re-transmit or proceed to transmission of next data if appropriate.

Unfortunately, however, due to interference on the air interface or for other reasons, it is possible that the acknowledgement message sent by the receiving device can be corrupted on its way to the transmitting device, and that the transmitting device may therefore receive the wrong acknowledgement. For instance, if the receiving device sends an ACK, the ACK may be corrupted and therefore arrive at the transmitting device seeming to be a NACK, or if the receiving device sends a NACK, the NACK may be corrupted and therefore arrive at the transmitting device as an ACK. This may be especially problematic if the acknowledgement message was an ACK that incorrectly arrives as a NACK, since the result of that error would be unnecessary re-transmission of the data segment, which may slow down data communication and diminish the user experience.

Disclosed herein is a method and corresponding system or apparatus to help avoid this problem. The disclosed method applies in a scenario where two nodes communicate with each other over an air interface that spans a particular frequency bandwidth having at least two distinct (e.g., mutually exclusive) portions. By way of example, the air interface may span a frequency bandwidth of 10 MHz (whether contiguous or non-contiguous), and that 10 MHz bandwidth may be considered to include two equal-sized 5 MHz portions of frequency spectrum or two non-equal sized portions (such as a 3 MHz portion and a 7 MHz portion), with the portions adding up to the full bandwidth or to only part of the full bandwidth.

In accordance with the method, ACK messages will be restricted to be sent in one of the portions of the frequency bandwidth, and NACK messages will be restricted to be sent in the other portion of the frequency bandwidth. That way, when the receiving node sends an acknowledgement message to the transmitting node, regardless of whether the acknowledgement messages gets corrupted (e.g., converted between ACK and NACK) on its way to the transmitting node, the transmitting node may determine whether the acknowledgement message is an ACK or a NACK based on which portion of frequency bandwidth the acknowledgement message was received in. In particular, if the transmitting node receives an acknowledgement message in the portion of frequency bandwidth designated to carry ACK messages, then the transmitting node may responsively consider the acknowledgement message to be an ACK even if the message reads as a NACK. And if the transmitting node receives an acknowledgement message in the portion of frequency bandwidth designated to carry NACK messages, then the transmitting node may responsively consider the acknowledgement message to be a NACK even if the message reads as an ACK.

Furthermore, in a representative implementation of this method, where the receiving node is receiving data transmissions from multiple transmitting nodes, the receiving node may send multiple such acknowledgement messages concurrently to the multiple transmitting nodes, distinguishing each of the concurrently sent acknowledgement messages by sending them on different carrier frequencies (e.g., different sub-carriers) and/or using different orthogonal spreading codes or the like. Applying the method in that scenario, the receiving node may then distribute the concurrent acknowledgement messages into the distinct portions of the frequency bandwidth, sending any ACKs on one or more carriers in the portion of frequency bandwidth designated to carry ACKs while sending the any NACKs on one or more carriers in the portion of frequency bandwidth designated to carry NACKs.

Accordingly, in one respect, disclosed is a method operable in a system in which a first node and second node communicate with each other over an air interface spanning a frequency bandwidth that includes at least two distinct portions.

The method includes the first node engaging in a transmission of data to the second node and then receiving from the second node, in one of the portions of frequency spectrum, an acknowledgement for the transmission. Further, the method includes the first node making a determination, based on which of the portions of frequency bandwidth the first node received the acknowledgement in, whether the received acknowledgement is a positive acknowledgement or rather a negative acknowledgement. And the method then includes the first node controlling, based on the determination, whether to engage in a re-transmission over the air interface to the second node.

Alternatively, taken from the perspective of the second node, the method includes the second node making a determination of whether the second node successfully received a transmission of data from the first node. Further, the method includes the second node selecting, based on the determination, one of the portions of the frequency bandwidth in which to transmit to the first node an acknowledgement for the transmission. In particular, if the determination is that the second node successfully received the transmission, then the second node responsively selects a first one of the portions, but if the determination is that the second node did not successfully receive the transmission, then the second node instead responsively selects a second, different, one of the portions. And the method then involves the second node transmitting the acknowledgement to the first node in the selected portion of the frequency bandwidth.

Still further, disclosed is a base station that is configured to serve UEs and to carry out aspects of the method as described above. Such a base station may include a wireless transceiver for communicating over an air interface with UEs served by the base station, where the air interface spans a frequency bandwidth that includes at least two distinct portions, and where the wireless transceiver receives data transmissions from the served UEs and transmits acknowledgements in response to the received data transmissions, each acknowledgement being either an ACK or a NACK. Further, the base station may include a controller (integrated with the wireless transceiver or provided separately) that causes the wireless transceiver to restrict the wireless transceiver's transmission of ACKs to be in a first one of the portions of the frequency bandwidth and to restrict the wireless transceiver's transmission of NACKs to be in a second, different one of the portions of the frequency bandwidth.

Further, the controller may carry out other functions as well, such as grouping ACKs together into one or more ACK groups, grouping NACKs together into one or more NACK groups, transmitting the one or more ACK groups in the first portion of the frequency bandwidth, and transmitting the one or more NACK groups in the second portion of the frequency bandwidth, perhaps with higher transmission power allocated for each ACK group transmission than for each NACK group transmission.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present method and corresponding system or apparatus will be described by way of example in the context of a cellular wireless communication system, and in a scenario where UEs transmit data to a base station and the base station sends acknowledgement messages to the UEs. It should be understood, however, that the principles described herein apply as well in the other direction between a base station and UEs, as well as to communications in any of a variety of other systems. Further, it should be understood that the numerous variations from the disclosure below are possible, including but not limited to various features (e.g., machines, interfaces, functions, orders, and groupings of functions, etc.) being modified, omitted, integrated with other elements, distributed, replicated, and provided in any suitable combination and location. In addition, various functions described herein as being performed by one or more entities may be carried out by hardware, firmware, and/or software. For instance, various functions may be carried out by a processor executing instructions stored in memory.

Figure 1:
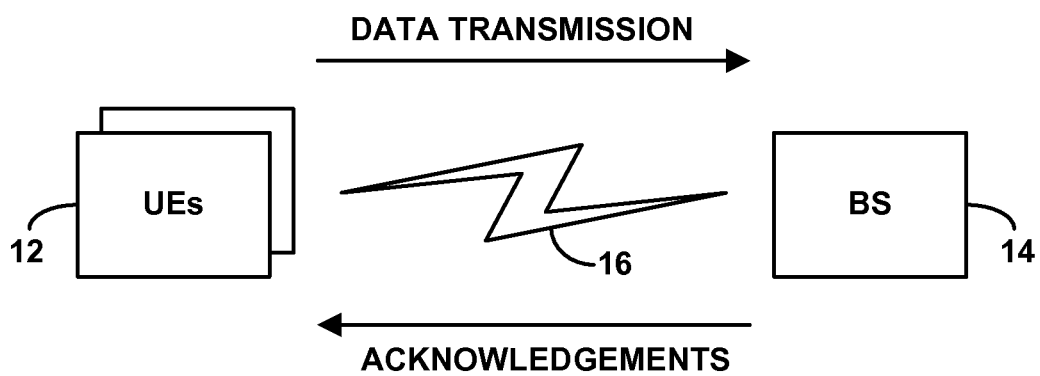
FIG. 1 is a simplified block diagram depicting example communication between UEs and a base station over an air interface.

Referring to the drawings, FIG. 1 is a simplified block diagram depicting an example arrangement in which UEs 12 communicate with a base station 14 over an air interface 16. As shown generally in this figure, the UEs transmit data to the base station over the air interface (in an "uplink" direction), and the base station responsively sends acknowledgements to the UEs over the air interface (in a "downlink" direction). In practice, the base station may schedule the UEs' transmissions to the base station so that the base station expects to receive the UE's transmissions at particular times and using particular uplink air interface resources, such as on particular subcarriers and using particular spreading codes for instance. And for each transmission that the base station expects to receive from a UE, on a per-subframe basis for instance, the base station may then determine whether the base station successfully receives the transmission, and accordingly send to the UE either an ACK or a NACK.

Figure 2:
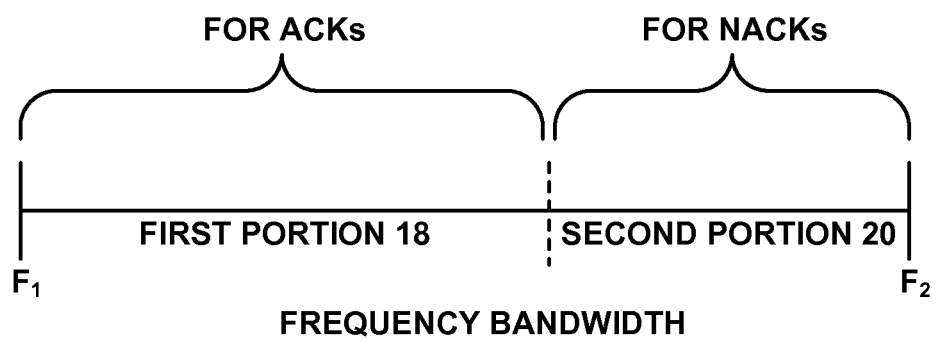
FIG. 2 is a diagram of example frequency bandwidth of the air interface.

FIG. 2 is next a simplified diagram depicting an example frequency bandwidth of the air interface 16. This bandwidth may be the range of frequency on which the base station is configured to engage in downlink communications, perhaps specifically a range of frequency on which the base station is configured to engages in downlink transmission of ACK and NACK messages. The example frequency bandwidth is shown as being one continuous range of frequency ranging from a lower frequency $F_1$ to a higher frequency $F_2$. In practice, however, the frequency bandwidth of the air interface may alternatively be made up of a number of non-contiguous blocks of frequency, in one or more industry bands for instance.

As shown in FIG. 2, the frequency bandwidth of the air interface may include at least two distinct portions, meaning discrete ranges of frequency spectrum that are mutually exclusive and thus do not overlap with each other in frequency. In the arrangement shown, for instance, the example frequency bandwidth includes a first portion 18 and a second portion 20. These portions are illustrated as being contiguous, cooperatively spanning the entire frequency bandwidth, and being of different sizes. In practice, however, the portions could be non-contiguous and might not cooperatively span the entire bandwidth. Further, each portion may itself be made up of multiple non-contiguous pieces of the frequency bandwidth. And the portions could be of equal size. In any event, each of the distinct portions may be defined in terms of the frequency range or ranges that the portion encompasses or spans. For instance, each portion may be defined as extending respectively from a particular frequency to another particular frequency or as consisting of multiple ranges each extending respectively from a particular frequency to another particular frequency.

In accordance with the present method, for purposes of transmission of acknowledgement messages to at least one UE, the base station will be arranged to restrict its transmission of ACKs to be in one of the portions of the frequency bandwidth and to restrict its transmission of NACKs to be in another one of the portions of the frequency bandwidth. Further, the UE will be arranged to determine, based on which portion of the frequency bandwidth the UE receives an acknowledgement in, whether the acknowledgement is an ACK or a NACK.

As shown in FIG. 2, for instance, the first portion 18 may be designated for use to carry ACKs (and not NACKs) and the second portion 20 may be designated for use to carry NACKs (and not ACKs). Thus, when the base station is going to transmit an acknowledgement to the UE, (i) if the acknowledgement is an ACK, the base station may responsively transmit it in the first portion 18, and, because the acknowledgement arrives in the first portion 18, the UE would deem it to be an ACK even if it has been corrupted and looks like a NACK, and (ii) if the acknowledgement is a NACK, the base station may responsively transmit it in the second portion 20, and, because the acknowledgement arrives in the second portion 20, the UE would deem it to be a NACK even if it has been corrupted and looks like an ACK.

With this arrangement, it may not matter whether the base station uses different data to represent an ACK than a NACK. The base station may use the same data to represent ACKs and NACKs, as the base station may distinguish between ACKs and NACKs by transmitting ACKs in first portion 18 and transmitting NACKs in the second portion 20. Alternatively, however, the base station could use different data to represent ACKs and NACKs, such as a particular bit or bit sequence to represent each ACK and a different particular bit or bit sequence to represent a NACK.

In practice, the UE and base station may each be provisioned (e.g., programmed or otherwise configured) with a specification that indicates which portion of the frequency bandwidth is for ACKs and which other portion of the frequency bandwidth is for NACKs. For instance, the base station could be programmed with such a specification, and the base station could further be programmed to include the specification in a broadcast message that the base station transmits generally within its coverage area, such as in a system parameters message, system information block, master information block, or the like, or to unicast the specification to the UE. The UE may then likewise be programmed with such a specification, and/or to receive from the base station the transmitted specification, and to store the specification for later reference in interpreting received acknowledgement messages.

In addition, the designation of which portion of the frequency bandwidth will be for ACKs and which other portion of the frequency bandwidth will be for NACKs could be changed from time to time, based on one or more factors, such as air interface quality of various parts of the frequency bandwidth. For example, the base station may receive from a UE one or more reports that indicate the quality (e.g., strength, signal-to-noise ratio, error rate, etc.) of each of various parts of the frequency bandwidth, and, based on the one or more received reports, the base station may identify a first, higher-quality portion of the frequency bandwidth based on the UE having reported relatively high quality of received communications in that first portion, and the base station may identify a second, lower-quality portion of the frequency bandwidth based on the UE having reported relatively low quality of received communications on that second portion. The base station may then deem the first, higher-quality portion to be for use to carry ACKs, so as to further help ensure successful receipt of the ACKs, and the base station may deem the second, lower-quality portion to be for use to carry NACKs. And the base station may accordingly transmit to the UE a specification indicating which portion will be used for ACKs and which other portion will be used for NACKs.

And as another example, the base station and UE could dynamically change which portion of the frequency bandwidth will be used for ACK transmissions and which other portion of the frequency bandwidth will be used for NACK transmissions, based on various other factors, such as time of day (e.g., according to a particular schedule), UE service level, and the like.

To send an acknowledgement message to a particular UE, the base station may send the acknowledgement message using one or more particular resources in a manner that enables the UE to receive the acknowledgement message. And the UE may correspondingly look for a transmission that uses the one or more particular resources, as a basis to receive an acknowledgement message transmitted to the UE. Further, as the present method allows for the possibility of the base station transmitting the acknowledgement message in either the first portion 18 of the frequency bandwidth or the second portion 20 of the frequency bandwidth based on whether the acknowledgement message is an ACK or NACK, and as the UE would not know in advance whether the acknowledgement message will be an ACK or a NACK, the base station and UE may be arranged to allow for either possibility.

In practice, for instance, each UE may have a unique value, such as an identifier, code, spreading sequence, channel ID, or the like, that the base station uses for or includes with transmissions to the UE in particular. Thus, when the base station transmits an acknowledgement message to the UE in either the first portion 18 or the second portion 20 as appropriate (based on whether the acknowledgement message is an ACK or a NACK), the base station may make use or include that unique value accordingly. The UE may then look at one portion of the frequency spectrum and at the next portion, until the UE finds an acknowledgement transmission that uses or includes the UE's unique value. In turn, once the UE thereby receives acknowledgement transmitted to the UE in particular, the UE may determine whether the acknowledgement is an ACK or a NACK based on whether the UE received the acknowledgement in the first portion 18 of the frequency bandwidth or rather in the second portion 20 of the frequency bandwidth.

As another example, before the base station sends an acknowledgement message to the UE, the base station may notify the UE that the base station will use one or more particular air interface resources to transmit an acknowledgement to the UE. For instance, at the time the base station assigns uplink air interface resources to the UE for the UE to transmit data to the base station, the base station may notify the UE what resources the base station will use to send to the UE an acknowledgement for that data transmission.

In practice, for instance, the resources may normally be a particular subcarrier or group of subcarriers in the frequency bandwidth, perhaps in combination with a particular spreading sequence. But with the present method, the base station may instead designate two such sets of resources, one for use in the first portion 18 of the frequency bandwidth, and the other for use in the second portion of the frequency bandwidth 20. For instance, the base station may designate a first subcarrier or subcarrier group in the first portion along with a first a spreading sequence, and a second subcarrier or subcarrier group in the second portion along with a second spreading sequence (perhaps the same as the first spreading sequence). The UE may then look for an acknowledgement in the subcarrier or subcarrier group of one portion and in then in the subcarrier or subcarrier group in the other portion of the frequency spectrum, until the UE finds an acknowledgement for the UE. And likewise here, once the UE thereby finds an acknowledgement transmitted to the UE in particular, the UE my determine whether the acknowledgement is an ACK or NACK based on whether the UE found the acknowledgement in the first portion 18 of the frequency bandwidth or rather in the second portion 20 of the frequency bandwidth.

The arrangement and method described above assumes that the base station and UEs communicate with each other according to an agreed air interface protocol. Examples of such air interface protocols include, OFDMA (e.g., LTE or Wireless Interoperability for Microwave Access (WiMAX)), Code Division Multiple Access (CDMA) (e.g., 1×RTT or 1×EV-DO), and Global System for Mobile Communications (GSM), and others now known or later developed.

To help further understand how the method can operate in practice, the following description will now consider an LTE arrangement by way of example.

In accordance with a recent version of LTE, a base station may provide a downlink air interface that spans a particular bandwidth, such as 3 MHz, 5 MHz, 10 MHz, 15 MHz, or 20 MHz, or perhaps an aggregate of such bandwidths, with the bandwidth defining a sequence of 15 kHz subcarriers. Further, the LTE downlink is divided over time into a continuum of radio frames, each 10 milliseconds long and each divided into ten 1 millisecond subframes, with each subframe in turn being divided into a number of 67 microsecond symbol spaces. With this arrangement, the LTE downlink thus defines an array of "resource elements," namely a sequence of 15 kHz resource elements every 67 microseconds, for carrying OFDM symbols. Further, in each 67 microsecond symbol space, the resource elements may be grouped into resource element groups (REGs) of four resource elements each.

Within each LTE subframe, the first line of resource elements (the first 67 microseconds) across the frequency bandwidth is arranged to carry certain control information from the base station to UEs. Included in this control information are OFDM symbols that define a Physical Hybrid Automatic Repeat Request (Hybrid-ARQ) Indicator Channel (PHICH) for carrying acknowledgement messages to served UEs. In particular, the first line of resource elements may define a number of PHICH groups, each made up of three REGs and thus twelve resource elements, with the PHICH groups being sequentially numbered across the bandwidth for convenient reference. In general, each PHICH group may support transmission of a three-bit acknowledgement message, such as 111 for ACK or 000 for NACK. Further, through use of orthogonal spreading using four-bit spreading codes, each PHICH group may support concurrent transmission of three-bit acknowledgement messages to up to eight UEs.

According to LTE, when a UE has data to transmit to a base station, the UE may transmit to the base station a scheduling request seeking allocation of uplink resources on which to transmit the data. The base station may then respond to the UE by transmitting downlink control information (DCI) that specifies the uplink resources in which the UE should transmit the data to the base station in a particular subframe. And the base station may include in the DCI to the UE a specification of the PHICH group and spreading code the base station will use for transmission of an acknowledgement message to the UE. For instance, the base station may specify in the DCI a PHICH index number and spreading code index number, for a PHICH in a subframe four milliseconds to follow the UE's data transmission. Thus, after the UE transmits data uplink to the base station, the UE may read the specified PHICH group, applying the specified spreading code, to read the acknowledgement message from the base station.

With the present method, the base station may be arranged to restrict ACK transmissions to be in one portion of the downlink bandwidth and NACK transmissions to be in a separate portion of the downlink bandwidth. These portions of the downlink bandwidth could be defined as particular frequency ranges as noted above. Alternatively or additionally, the portions could be defined in terms of sets of PHICH groups. For instance, if the frequency bandwidth is 10 MHz and defines a sequence of 13 PHICH groups, the base station could designate the lower 6 MHz for to be used for ACK transmission and the upper 4 MHz to be used for NACK transmission, or the base station could designate the first 8 PHICH groups to be used for ACK transmission and the remaining 5 PHICH groups to be used for NACK transmission. Alternatively, the base station could define other such mappings. For instance, the base station could designate PHICH groups 0-3 and 8-11 to be for ACK transmission and PHICH groups 4-6 and 12-13 to be for NACK transmission. Other examples are possible as well.

As noted above, the base station may broadcast or otherwise transmit to served UEs the specification of which portion of the frequency bandwidth will be used for ACK transmission and which other portion of the frequency bandwidth will be used for NAK transmission. By way of example, the base station could include such a specification in an overhead message such as an LTE master information block (MIB) or system information block (SIB). Each served UE may then be arranged to read that broadcast information to determine the mapping between portions of the frequency bandwidth and acknowledgement message type.

When the LTE base station schedules uplink data transmission from a UE, the base station may then designate two sets of PHICH resources, one in the portion of the frequency bandwidth designated for carrying ACKs and the other in the portion of the frequency bandwidth designated for carrying NACKs. For instance, in the DCI that the base station sends to the UE, perhaps a newly defined DCI format, the base station may specify two PHICH groups, one in the portion designated for carrying ACKs and the other in the portion designated for carrying NACKs. Further, the base station may specify a respective spreading code for each of those PHICH groups, or the base station may specify the same spreading code for both.

At the appropriate time (e.g., four subframes after the UE's uplink transmission), the UE may then read one specified PHICH group and then the other specified PHICH group, using the applicable spreading code(s), until the UE finds an acknowledgement message transmitted to the UE. And the UE may conveniently determine whether the acknowledgement message is an ACK or a NACK based on which portion of the frequency bandwidth (e.g., which one of the specified PHICH groups) the UE received the acknowledgement message in.

Furthermore, in a scenario where the base station is serving numerous UEs and is transmitting acknowledgement messages to multiple such UEs concurrently (e.g., in the same 67 microsecond symbol space of a subframe), the base station may additionally help to ensure successful receipt of ACK transmissions by using greater power for ACK transmissions than for NACK transmissions. In particular, the base station may specifically group all ACK messages into one or more PHICH groups in the frequency portion designated for carrying ACKs, and all NACK messages into one or more other PHICH groups in the frequency portion designated for carrying NACKs. And the base station may allocate greater downlink transmission power to the one or more ACK PHICH groups than to the one or more NACK PHICH groups.

Figure 3:
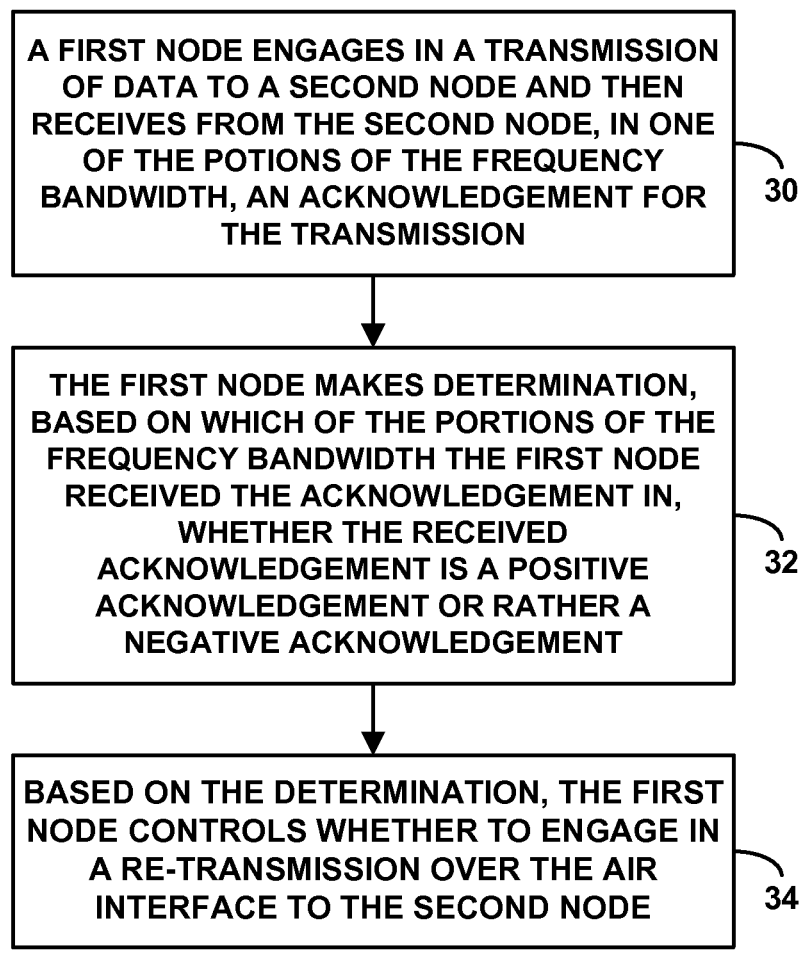
FIG. 3 is a flow chart depicting functions that can be carried out in accordance with the disclosure.

FIG. 3 is next a flow chart depicting functions that can be carried out in accordance with the present method, in a system where a first node and second node communicate with each other over an air interface spanning a frequency bandwidth that includes at least two distinct portions. As shown in FIG. 3, at block 30, the first node engages in transmission of data to the second node and then receives from the second node, in one of the portions of the frequency bandwidth, an acknowledgement for the transmission. At block 32, the first node then makes a determination, based on which of the portions of the frequency bandwidth the first node received the acknowledgement in, whether the received acknowledgement is a positive acknowledgement or rather a negative acknowledgement. And at block 34, based on the determination, the first node controls whether to engage in a re-transmission over the air interface to the second node. In particular, if the determination was that the received acknowledgement is a negative acknowledgement, then the first node may responsively re-transmit to the second node, perhaps as a Hybrid-ARQ re-transmission that adds or substitutes some error correction coding. Whereas, if the determination was that the received acknowledgement is a positive acknowledgement, then the first node may responsively not re-transmit to the second node but may instead proceed to engage in a next data transmission to the second node.

In this process, the first node may store a specification of which portion of the frequency bandwidth will carry positive acknowledgements and which other portion of the frequency bandwidth will carry negative acknowledgements, such as a specification that the first node receives from the second node for instance. The first node may then make the determination of whether the received acknowledgement is a positive acknowledgement or rather a negative acknowledgement by (i) determining which portion of the frequency bandwidth the first node received the acknowledgement in, and (ii) referring to the specification to determine, based on the determined portion, whether the received acknowledgement is a positive acknowledgement or rather a negative acknowledgement.

Figure 4:
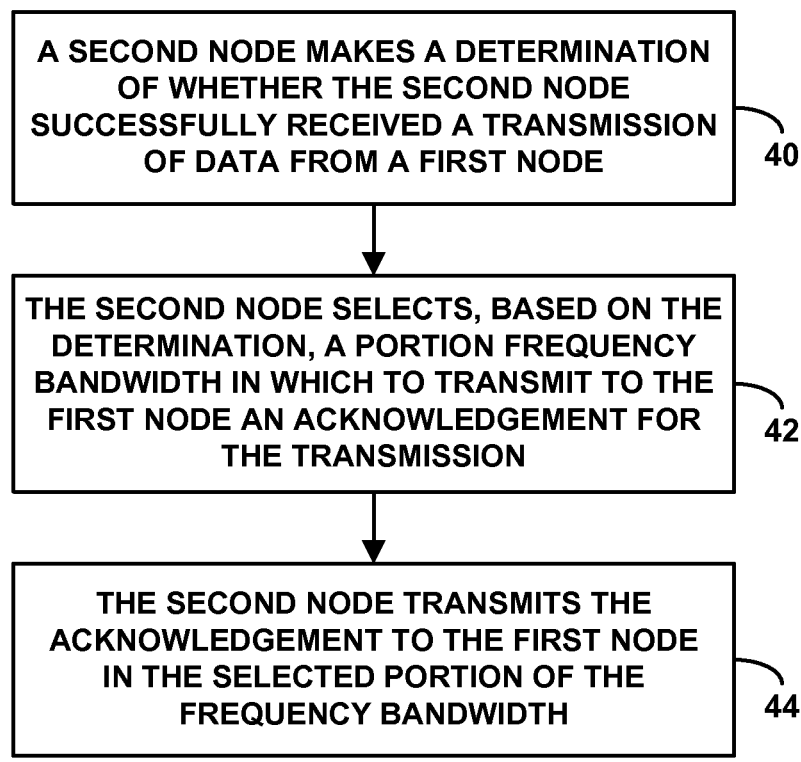
FIG. 4 is another flow chart depicting functions that can be carried out in accordance with disclosure.

FIG. 4 is in turn a flow chart depicting functions that can be carried out in accordance with the present method, in a similar system, but from the perspective of the second node. As shown in FIG. 4, at block 40, the second node makes a determination of whether the second node successfully received a transmission of data from the first node, such as by determining whether the second node receives the data and applying a cyclic redundancy check (CRC) or other process to determine if the received data is error free. At block 40, the second node then selects, based on the determination, one of the portions of frequency bandwidth in which to transmit to the first node an acknowledgement for the transmission. In particular, the second node selects a first one of the portions if the determination is that the second node successfully received the transmission, but the second node instead selects a second, different, one of the portions if the determination is that the second node did not successfully receive the transmission. At block 42, the second node then transmits the acknowledgement to the first node in the selected portion of the frequency bandwidth.

In practice, the second node may also transmit over the air interface a specification indicating which portion of the frequency bandwidth will be used to carry positive acknowledgements that indicate successful receipt of transmissions and which other portion of the frequency bandwidth will be used to carry negative acknowledgements that indicate lack of successful receipt of transmissions. For instance, the second node may broadcast the specification, in an overhead message for instance, or the second node may unicast the specification to the first node.

Figure 5:
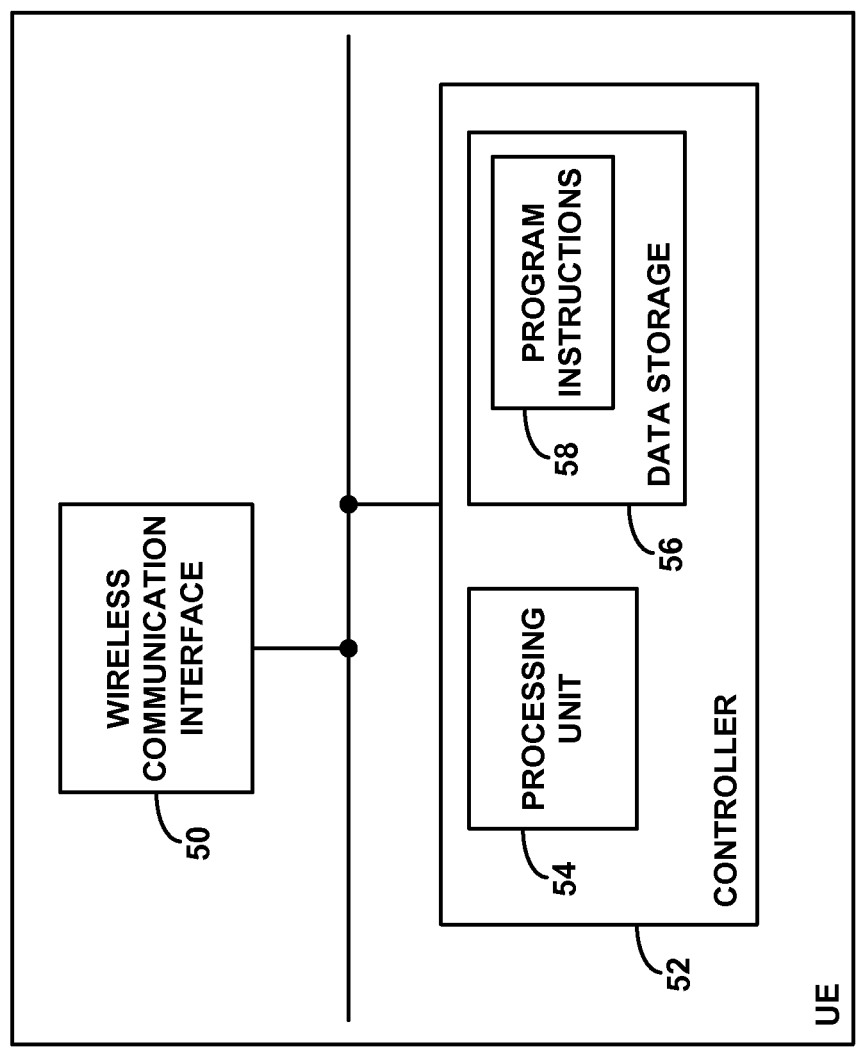
FIG. 5 is a simplified block diagram of an example UE that may operate in accordance with the disclosure.

FIG. 5 is next a simplified block diagram depicting an example UE arranged to carry out aspects of the present method. As shown in FIG. 5, the example UE may include a wireless transceiver 50 and a controller 52, which may be integrated together (e.g., on a common chipset) or may be separate components of the UE.

The wireless transceiver 50 may be coupled with an antenna structure (not shown) and may function to communicate over an air interface with a base station. In line with the discussion above, the air interface may span a frequency bandwidth that includes at least two distinct portions, and the wireless transceiver may receive acknowledgement messages in response to data transmissions from the UE.

The controller 52 may then include a processing unit 54, data storage 56, and program instructions 58 stored in the data storage 56 and executable by the processing unit 54 to carry out various UE functions described herein, including for instance receiving an acknowledgement message from the base station, determining which portion of the frequency bandwidth the UE received the acknowledgement message in, and, based on the determined portion, determining whether the received acknowledgment message is an ACK or rather a NACK.

Figure 6:
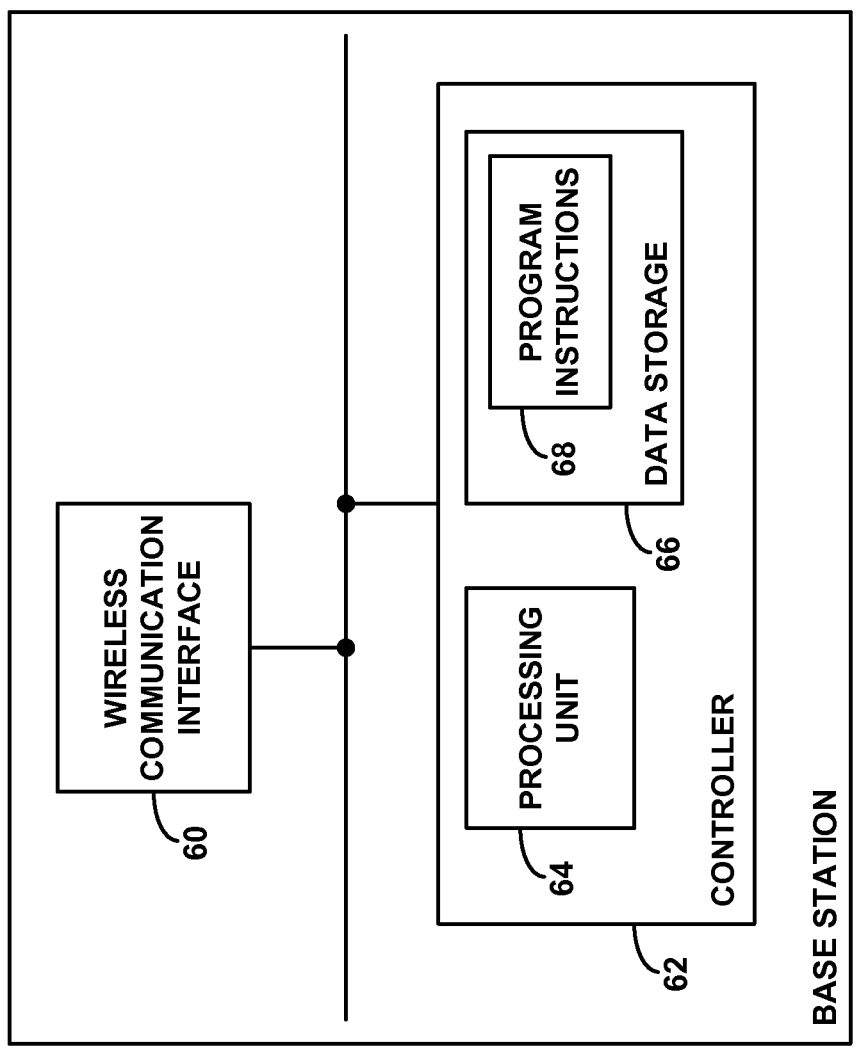
FIG. 6 is a simplified block diagram of an example base station that may operate in accordance with the disclosure.

Finally, FIG. 6 is next a simplified block diagram depicting an example base station arranged to carry out aspects of the present method. As shown in FIG. 6, the example base station includes a wireless transceiver 60 and a controller 62, which may be integrated together (e.g., on a common chipset) or may be separate components of the base station.

The wireless transceiver 60 may be coupled with an antenna structure (not shown) and may function to communicate over an air interface with UEs served by the base station. In line with the discussion above, the air interface may span a frequency bandwidth that includes at least two distinct portions, and the wireless transceiver may receive data transmissions from the served UEs and transmit acknowledgements in response to the received data transmissions, each acknowledgement being either an ACK or a NACK.

The controller 62 may then include a processing unit 64, data storage 66, and program instructions 68 stored in the data storage 66 and executable by the processing unit 64 to carry out various base station functions described herein, including for instance providing data to the wireless transceiver 60 for transmission over the air interface and controlling aspects of such air interface transmission.

In accordance with the present method, for example, the controller may restrict wireless transceiver's transmission of ACKs to be in a first one of the portions of the frequency bandwidth and the wireless transceiver's transmission of NACKs to be in a second one of the portions of the frequency bandwidth. For example, in line with the discussion above, the controller may determine whether the base station has successfully received a particular data transmission from a UE and (i) if so, the controller may cause the wireless transceiver to responsively transmit to the UE an ACK in the first portion of frequency bandwidth, but (ii) if not, the controller may cause the wireless transceiver to responsively transmit to the UE a NACK in the second portion of frequency bandwidth.

Also in line with the discussion above, in a scenario where the base station receives data transmissions from multiple UEs, the controller may group any ACKs together into one or more ACK groups, the controller may separately group any NACKs together into one or more NACK groups, and the controller may cause the wireless transceiver to transmit the one or more ACK groups in the first portion of frequency bandwidth and to transmit the one or more NACK groups in the second portion of frequency bandwidth. And the controller may cause the wireless transceiver to transmit each ACK group with higher transmission power than each NACK group.

Moreover, the controller may cause the wireless transceiver to broadcast an indication of which portion of frequency bandwidth will carry ACKs and which other portion of frequency bandwidth will carry NACKs. And the controller may cause the wireless transceiver to transmit to a UE a control message that (i) schedules uplink transmission from the UE to the base station and (ii) notifies the UE of acknowledgement locations in the first portion and second portion, such as particular subcarriers or PHICH groups for instance.

Exemplary embodiments have been described above. It should be understood, however, that variations from these embodiments are possible, while remaining within the true spirit and scope of the invention.

We claim:

1. A method operable in a system in which a first node and second node communicate with each other over an air interface spanning a frequency bandwidth that includes at least two distinct portions including a first portion and a second portion, the method comprising:

engaging by the first node in a transmission of data to the second node and then receiving by the first node from the second node, in one of the portions of the frequency bandwidth, an acknowledgement for the transmission;

making a determination by the first node, based on which of the portions of the frequency bandwidth the first node received the acknowledgement in, whether the received acknowledgement is a positive acknowledgement or rather a negative acknowledgement, wherein (a) if the first node received the acknowledgement in the first portion rather than in the second portion, then, based on the first node having received the acknowledgement in the first portion, the determination is that the acknowledgement is a positive acknowledgement and (b) if the first node received the acknowledgment in the second portion rather than the first portion, then, based on the first node having received the acknowledgement in the second portion, the determination is that the acknowledgement is a negative acknowledgement; and controlling by the first node, based on the determination, whether to engage in a re-transmission over the air interface to the second node.

2. The method of claim 1, further comprising:

storing by the first node a specification of which portion of the frequency bandwidth will carry positive acknowledgements and which other portion of the frequency bandwidth will carry negative acknowledgements, wherein making the determination by the first node of whether the received acknowledgement is a positive acknowledgement or rather a negative acknowledgement comprises (i) determining which portion of the frequency bandwidth the first node received the acknowledgement in, and (ii) based on the specification and the portion of the frequency bandwidth in which the first node received the acknowledgement in, making the determination of whether the received acknowledgement is a positive acknowledgement or rather a negative acknowledgement.

3. The method of claim 2, further comprising receiving by the first node, from the second node, the specification of which portion of the frequency bandwidth will carry positive acknowledgements and which other portion of the frequency bandwidth will carry negative acknowledgements.

4. The method of claim 3, wherein the first node is a user equipment device (UE) and the second node is a base station serving the UE, and wherein receiving the specification comprises receiving the specification in an overhead message broadcast by the base station.

5. The method of claim 4, wherein the air interface is an orthogonal frequency division multiple access (OFDMA) air interface.

6. The method of claim 1, wherein the re-transmission is a hybrid automatic repeat request (hybrid-ARQ) re-transmission.

7. A method operable in a system in which a first node communicates wirelessly with a second node over an air interface that spanning a frequency bandwidth that includes at least two distinct portions, the method comprising:

making a determination, by the second node, of whether the second node successfully received a transmission of data from the first node;

selecting by the second node, based on the determination, one of the portions of frequency bandwidth in which to transmit to the first node an acknowledgement for the transmission, wherein (i) if the determination is that the second node successfully received the transmission, then the second node selects a first one of the portions in which to transmit the acknowledgement, but (ii) if the determination is that the second node did not successfully receive the transmission, then the second node instead selects a second, different, one of the portions in which to transmit the acknowledgement; and transmitting the acknowledgement by the second node to the first node, in the selected portion of the frequency bandwidth.

8. The method of claim 7, further comprising:

transmitting over the air interface, by the second node, a specification indicating which portion of the frequency bandwidth will be used to carry positive acknowledgements that indicate successful receipt of transmissions and which other portion of the frequency bandwidth will be used to carry negative acknowledgements that indicate lack of successful receipt of transmissions.

9. The method of claim 8, wherein transmitting the specification comprises broadcasting the specification.

10. The method of claim 8, wherein transmitting the specification comprises unicasting the specification to the first node.

11. The method of claim 7, wherein making a determination of whether the second node successfully received the transmission of data from the first node comprises:

determining whether the second node received the transmission and, if so, whether the received transmission was error free.

12. The method of claim 7, wherein the first node is a user equipment device (UE), and wherein the second node is a cellular base station serving the UE.

13. The method of claim 12, wherein the air interface is an orthogonal frequency division multiple access (OFDMA) air interface.

14. A base station comprising:

a wireless transceiver for communicating over an air interface with user equipment devices (UEs) served by the base station, wherein the air interface spans a frequency bandwidth that includes at least two distinct portions, and wherein the wireless transceiver receives data transmissions from the served UEs and transmits acknowledgements in response to the received data transmissions, each acknowledgement being selected from the group consisting of a positive acknowledgement (ACK) and a negative acknowledgement (NACK); and a controller, wherein the controller restricts the wireless transceiver's transmission of ACKs to be in a first one of the portions of frequency bandwidth and restricts the wireless transceiver's transmission of NACKs to be in a second, different one of the portions of frequency bandwidth, wherein, when the base station transmits an acknowledgement, (i) if the acknowledgement is an ACK, then, based on the acknowledgement being an ACK, the base station transmits the acknowledgement in the first portion of the frequency bandwidth and (ii) if the acknowledgement is a NACK, then, based on the acknowledgement being a NACK, the base station transmits the acknowledgement in the second portion of the frequency bandwidth.

15. The base station of claim 14, wherein, for a data transmission from a UE, the controller determines if the base station successfully received the data transmission and (i) if so, the controller causes the wireless transceiver to responsively transmit to the UE an ACK in the first portion of frequency bandwidth, but (ii) if not, the controller causes the wireless transceiver to responsively transmit to the UE a NACK in the second portion of frequency bandwidth.

16. The base station of claim 14, wherein, for data transmissions from multiple UEs, the controller groups any ACKs together into one or more ACK groups, the controller groups any NACKs together into one or more NACK groups, and the controller causes the wireless transceiver to transmit the one or more ACK groups in the first portion of frequency bandwidth and to transmit the one or more NACK groups in the second portion of frequency bandwidth.

17. The base station of claim 16, wherein the controller causes the wireless transceiver to transmit each ACK group with higher transmission power than each NACK group.

18. The base station of claim 14, wherein the controller further causes the wireless transceiver to broadcast an indication of which portion of frequency bandwidth will carry ACKs and which other portion of frequency bandwidth will carry NACKs.

19. The base station of claim 14, wherein the controller further causes the wireless transceiver to transmit to a UE a control message that (i) schedules uplink transmission from the UE to the base station and (ii) notifies the UE of acknowledgement locations in the first portion and second portion.

20. The base station of claim 14, wherein the air interface is an orthogonal frequency division multiple access (OFDMA) air interface.

* * * * *